(12) United States Patent
Durst

(10) Patent No.: US 6,688,170 B1
(45) Date of Patent: Feb. 10, 2004

(54) SENSOR FOR MEASURING FLOW VELOCITY IN GASES AND METHOD FOR THE PRODUCTION THEREOF

(76) Inventor: Franz Durst, Eichenstrasse 12, Langensendelbach (DE), 91095

( * ) Notice: Subject to any disclaimer, the term of this patent is extended or adjusted under 35 U.S.C. 154(b) by 223 days.

(21) Appl. No.: 09/856,691
(22) PCT Filed: Sep. 25, 2000
(86) PCT No.: PCT/DE00/03334
§ 371 (c)(1), (2), (4) Date: Jun. 17, 2002
(87) PCT Pub. No.: WO01/23843
PCT Pub. Date: Apr. 5, 2001

(30) Foreign Application Priority Data

Sep. 28, 1999 (DE) .......................... 199 46 533

(51) Int. Cl.$^7$ ................................. G01F 1/68
(52) U.S. Cl. ................... 73/204.27; 73/204.26
(58) Field of Search ............ 73/861.95, 204.14, 73/204.21, 204.27, 204.26

(56) References Cited

U.S. PATENT DOCUMENTS

| | | | | |
|---|---|---|---|---|
| 4,074,566 A | * | 2/1978 | Obayashi et al. | 73/204.27 |
| 4,335,616 A | | 6/1982 | Oliva et al. | |
| 4,363,238 A | * | 12/1982 | Willam | 73/204.21 |
| 4,604,895 A | * | 8/1986 | Watkins | 73/204.27 |
| 5,027,652 A | * | 7/1991 | Goebel et al. | 73/204.26 |
| 5,347,876 A | * | 9/1994 | Kang et al. | 73/861.95 |

FOREIGN PATENT DOCUMENTS

| | | |
|---|---|---|
| DE | 2649040 A1 | 5/1978 |
| DE | 3234146 A1 | 3/1984 |
| DE | 19609823 A1 | 9/1997 |
| DE | 19623323 A1 | 10/1997 |
| JP | 03289647 | 1/1993 |

OTHER PUBLICATIONS

C.A. Mosse and S.P. Roberts, Microprocessor–based time–of–light respirometer, Medical & Biological Engineering & Cmputing, Jan. 25, 1987, pp. 34–40, No. 1, Stevenage, Herts, UK.

* cited by examiner

Primary Examiner—Harshad Patel
(74) Attorney, Agent, or Firm—Rankin, Hill, Porter & Clark LLP

(57) ABSTRACT

A sensor for measuring the flow velocity of gases. The sensor includes a printed circuit board (1) having an opening (2) formed therein. A pair of first contact elements are disposed on opposing sides of the opening on an upper side of the circuit board (1), and a pair of second contact elements are disposed on opposing sides of the opening on a lower side of the circuit board (1). A first wire (4) with end portions respectively connected to the first contact elements extends across the opening (2) on the upper side of the circuit board (1). A second wire (10) with end portions respectively connected to the second contact elements extends across the opening (2) on the lower side of the circuit board (1).

18 Claims, 2 Drawing Sheets

SENSOR FOR MEASURING FLOW VELOCITY IN GASES AND METHOD FOR THE PRODUCTION THEREOF

BACKGROUND OF THE INVENTION

The invention relates to a sensor for measuring the flow velocity of gases and to a method for the production thereof.

It is known, for example from DE 32 34 146 A1, DE 196 23 323 A1 or DE 27 23 809 A1, to measure the velocity of gas flows thermally on the basis of the "time of flight". A transmission wire arranged in the gas stream transmits a periodic heat signal. The heat signal is transported by the flow and is sensed after a "time of flight" by a reception wire arranged downstream. The "time of flight" or the phase shift proportional to the latter of the heating signal sensed by the reception wire is a measure of the flow velocity.

In the "time-of-flight measuring methods", it is assumed that the relationship between the time of flight $\Delta t$ and the flow velocity U is linear. The following relationship applies for calculating the flow velocity $$\Delta t = \Delta x (1/U),$$

where $\Delta x$ is the distance between the transmission wire and the reception wire.

A sensor known from the brochure "Probes for hot-wire anemometry" of the company Dantec Measurement Technology A/S, Denmark, has a transmission wire and reception wire, which are respectively mounted on the tips of two prongs protruding into the gas stream in order to avoid heat losses. The mounting of the transmission wire and reception wire on the tips of the prongs is difficult. In the case of such sensors, the distance between the transmission wire and the reception wire can scarcely be set in a reproducible manner. They must therefore be calibrated before they are used. Each sensor has a specific calibration curve. The evaluation electronics must be re-tuned to each sensor.

Further sensors are known from DE 196 09 823 A1 and DE 28 45 661 C2. The production and/or mounting of these sensors is complex.

SUMMARY OF THE INVENTION

It is an object of the invention to specify a sensor for the thermal measurement of flow velocity which can be produced in a simple and low-cost way. According to a further aim of the invention, the sensor is to be reproducible with high accuracy and, as far as possible, not have to be individually calibrated.

This object is achieved by the features of the independent claims. Expedient configurations are provided by the features of the dependent claims.

According to the invention, a sensor for measuring the flow velocity of gases is provided, a printed-circuit board provided with a clearance having two opposing first contact elements on its upper side close to the edge of the clearance and two opposing second contact elements on its underside close to the edge of the clearance, and a first wire, spanning the clearance, being connected to the first contact elements and a second wire, spanning the clearance, being connected to the second contact elements.

The sensor can be produced in a simple and low-cost way. The time-consuming and difficult mounting of the transmission wire or first wire and of the reception wire or second wire on the tips of the prongs is no longer needed. The sensor can be produced automatically and at low cost. The distance between the two wires can be reproduced with high accuracy. It is possible to dispense with individual calibration of sensors produced in such a way.

The first wire and/or second wire expediently has a diameter of 5–25 μm, preferably of 12.5 μm. Such a wire can be electrically bonded in an automated manner.

According to one configurational feature, the contact elements have ring segments which segmentally surround the clearance and advantageously have two first grooves, oriented parallel to each other. They may have two further grooves, which form an angle of 25–45°, preferably of 35°, with the first grooves. With the proposed embodiment, it is particularly easy for the wire to be mounted with a predetermined tensile stress. Consequently, a straightness of the wire required for high measuring accuracy is achieved. The tensile stress can be maintained in particular by the two grooves arranged at an angle, because the wire is in this case held with friction-locking support.

The contact surfaces bounding the two grooves are expediently connected in each case to one of the ring segments via a first conductor track. Each of the contact elements may be connected to a contact pad via a second conductor track. The contact pads may have clearances for wires to be electrically bonded. The proposed structuring of the conductor tracks makes it possible in practice for the sensors according to the invention to be produced in a simple procedure and without any defects.

It has proven to be expedient for the printed-circuit board to have a length of 17–23 mm, preferably of 20 mm, a width of 5–10 mm, preferably of 7 mm, and a thickness of 1–3 mm, preferably of 1.5 mm. The clearance may have a diameter of 2–5 mm, preferably of 3 mm. The distance between the first wire and the second wire is expediently less than 3 mm, preferably approximately 1.5 mm. A sensor with the aforementioned dimensions is suitable universally for measuring the velocity of a gas flow.

The second contact elements may be formed mirror-invertedly in relation to the first contact elements. In this connection, the major middle plane of the printed-circuit board is regarded as the mirror surface.

A conically widening portion of tube may be provided upstream and/or downstream of the clearance. The portion of tube preferably adjoins the printed-circuit board directly, its smaller diameter facing the printed-circuit board. The conical shape of the tube portions has the effect of accelerating the gas stream. Consequently, even very low gas flow velocities can also be measured. Furthermore, a sensor designed in such a way is also suitable for the exact measurement of small volumetric flows. Finally, the conical tube portions serve for protecting the wires from mechanical damage.

According to a further measure of the invention, a method for the production of the sensor according to the invention is provided, the first wire being placed into the first and second grooves of the first contact element, subjected to a predetermined tensile stress and subsequently electrically bonded, and the second wire being placed into the first and second grooves of the second contact element, subjected to a predetermined tensile stress and subsequently electrically bonded.

It goes without saying that it is also possible to provide a plurality of first and second grooves arranged in parallel next to one another on the first and second contact elements for receiving a plurality of first and second wires arranged next to one another.

Such arrangements may be expedient for particular measuring requirements.

One alternative provides a method for the production of a sensor according to the invention in which a) a multiplicity of first contact elements (3) are produced next to one another on an upper side and a multiplicity of second contact elements are produced on an underside of a printed-circuit board, b) a first wire (4) is placed over the multiplicity of first contact elements (3) under the effect of a predetermined tensile stress, c) subsequently electrically bonded, d) a second wire (10) is placed over the multiplicity of second contact elements under the effect of a predetermined tensile stress and e) is subsequently electrically bonded.

In this variant of the method as well, the first and/or second wire may be placed into first and possibly second grooves formed in the first and/or second contact element. This makes it easier for an applied tensile stress to be maintained.

In the case of both variants of the method, it is advantageous to solder the first wire and the second wire to the first and second contact elements, respectively. The printed-circuit board may be turned through 180° after the electrical bonding of the first wire and then the second wire is brought into contact with the second contact elements. As a result, the production costs can be further reduced, because only one device is required for the feeding in of wire and its electrical bonding. Here, the provision of first and second grooves is possible, but not absolutely necessary.

In the case of the second variant of the method, the printed-circuit board is expediently divided into individual boards after the electrical bonding of the first and second wires. The dividing of the printed-circuit board into the individual boards may take place by breaking at predetermined breaking points or by cutting by means of suitable cutting devices.

The proposed methods can be automated in a simple manner. High numbers of units can be produced at low cost.

BRIEF DESCRIPTION OF THE DRAWING

An exemplary embodiment of the invention is explained in more detail below with reference to the drawing, in which.

DETAILED DESCRIPTION OF THE PREFERRED EMBODIMENTS

Figure 1:
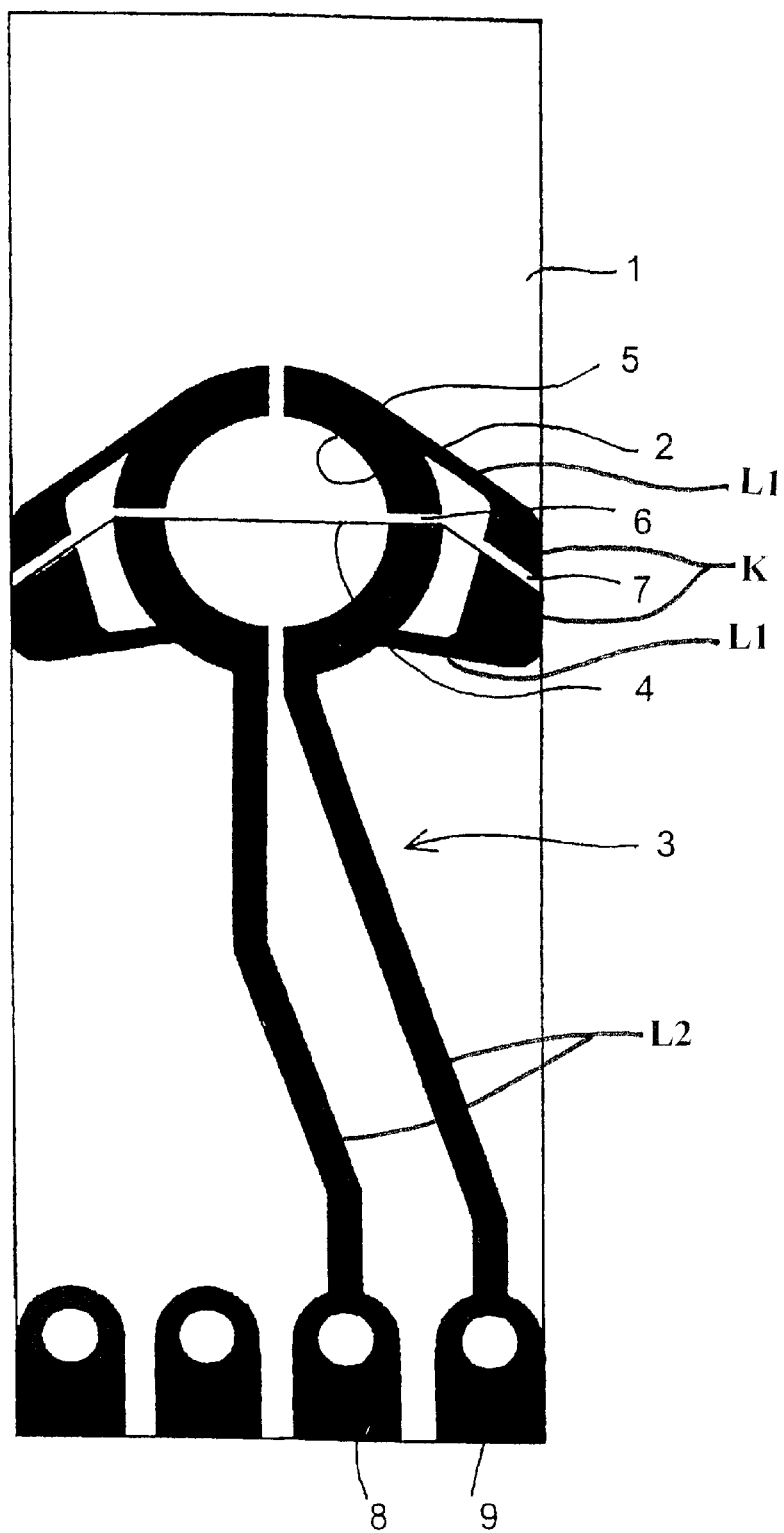
FIG. 1 shows a printed-circuit board in plan view.

A first wire 4 with a diameter of, for example, 15 $\mu$m spans the clearance 2. The clearance 2 serves for the passing through of the gas flow to be measured. It is surrounded by ring segments 5 of the first contact elements 3. The first contact elements 3 have two first grooves 6, oriented parallel to each other. At a distance from them, second grooves 7 are provided on both sides, forming an angle of approximately 35° with the first grooves 6. Contact surfaces K bound the second grooves 7. Each of the contact surfaces K is connected to one of the ring segments 5 via a first conductor track L1. Two ring segments 5 lying next to each other and arranged at a distance from each other are respectively connected to contact pads 8, 9 via second conductor tracks L2.

The first wire 4 is connected in an electrically conducting manner to the first contact elements 3 in the region of the first grooves 6 and/or second grooves 7 by means of a soldering point (not shown here). Contact pads 8, 9 serve for the connection of the sensor to a suitable evaluation circuit. They may have a clearance for the leading through of a wire.

Figure 2:
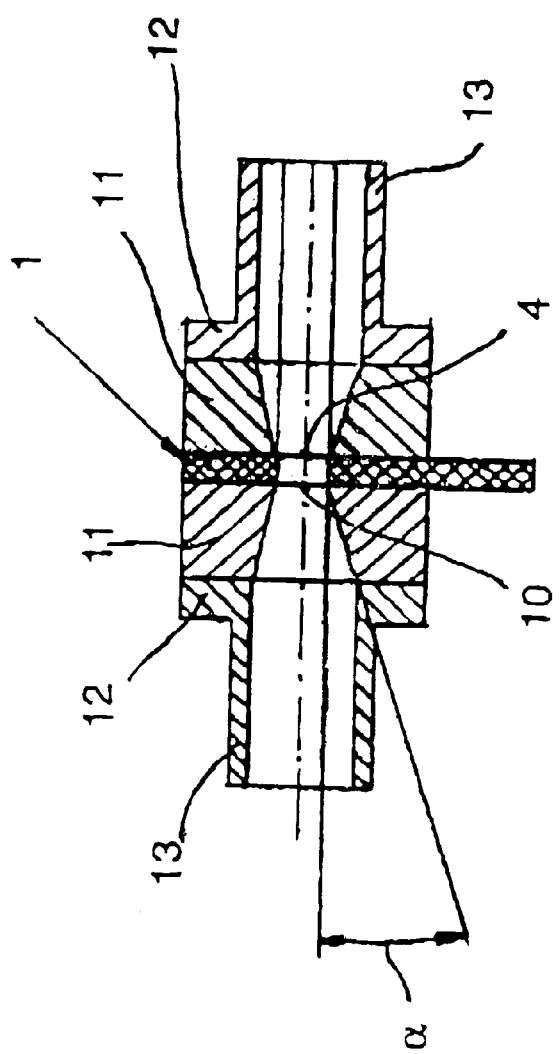
FIG. 2 shows a schematic sectional view of a flow sensor.

In FIG. 2, a flow sensor is shown. Conically widening tube portions 11 are respectively attached upstream of the first wire 4 and downstream of the second wire 10. These bear in each case with their small opening directly against the printed-circuit board 1. Bearing against each of the tube portions 11, upstream and downstream, is a flange 12 of a tube 13. An angle of conicity $\alpha$ is between 5 and 20°, preferably 14°. The conical tube portions 11 and the tubes 13 are expediently produced from injection-molded plastic.

According to a further exemplary embodiment, not shown here, the first contact elements 3 of the upper side are not arranged mirror-invertedly in relation to those of the underside. The contact elements are configured in such a way that the wire provided on the upper side is perpendicular to the wire attached on the underside. This crossed arrangement of the wires is of advantage in particular if, in the practical use of the sensor, tilting of the same with respect to the flow vector of the flow to be measured or changing of the flow vector cannot be ruled out. On account of the crossing of the wires, it is always ensured here that the transmitted heating signal is picked up by the reception wire. With the parallel arrangement of the wires, on the other hand, it is possible, in particular at high flow velocities, for the heating signal not to be picked up by the reception wire if the flow impinges obliquely on the sensor.

For the production of the sensor, according to a first variant of the method, firstly the first wire 4 is placed into the first grooves 6 and second grooves 7 on the upper side of the printed circuit board 1 and is subjected to a predetermined tensile stress. Then, the first wire 4 is connected to the first contact elements 3 by means of soldering. Subsequently, the printed-circuit board 1 can be turned through 180° and the method sequence described above can be repeated once again for the fastening of the second wire 10.

According to a second variant of the method, a multiplicity of first contact elements 3 are produced next to one another on an upper side of a printed-circuit board by means of an etching technique. A plurality of rows of such first contact elements arranged next to one another may be provided on the upper side of the printed-circuit board. In a corresponding design, a multiplicity of second contact elements are in each case produced next to one another on the underside of the printed-circuit board by means of an etching technique. Here, too, a plurality of rows of second contact elements may be provided. The first and second contact elements are arranged in such a way that the first wire and second wire can be placed over the entire width or length of the printed-circuit board and be subjected to a predetermined tensile stress. It may also be the case that the first and/or second wire is placed into first and possibly second grooves formed in the first and/or second contact element. Consequently, a predetermined tensile stress can be maintained in a suitable way over a multiplicity of contact elements. Subsequently, the first wire or second wire can be respectively electrically bonded to the first and second contact elements by soldering. With the method proposed, a multiplicity of first or second contact elements can be electrically bonded simultaneously. After the electrical bonding of the contact elements, the printed-circuit board is cut to produce the individual boards.

Subsequently, the conically tapering tube portions 11 are attached with their smaller openings to the clearance 2 of the printed-circuit board 1. This arrangement can then be received as a whole in a housing comprising two plastic half shells (not shown here). The plastic half shells bear in each case with tubes 13 formed on them against the larger opening of the tube portions 11 in a sealed manner. For easy mounting, the plastic half shells can be connected to each other by means of a snap-in connection. The plastic half shells may be formed in one piece with the tubes 13 and the conically lengthening tube portions 11.

In this way, sensors for measuring the flow velocity of gases can be produced in a simple manner, in which the distance between the wires 4, 10 can be reproduced very well. It is possible to dispense with a calibration of such sensors.

List of Designations

| | |
|---|---|
| 1 | printed-circuit board |
| 2 | clearance |
| 3 | first contact elements |
| 4 | first wire |
| 5 | ring segments |
| 6 | first groove |
| 7 | second groove |
| 8, 9 | contact pads |
| 10 | second wire |
| 11 | conical tube portion |
| 12 | flange |
| 13 | tube |
| L1 | first conductor track |
| L2 | second conductor track |
| K | contact surface |

What is claimed is:

1. A sensor for measuring a flow velocity of gases, comprising a printed-circuit board (1) defining an opening (2) and having two opposing first contact elements (3) on its upper side close to an edge of the opening (2), two opposing second contact elements on its underside close to the edge of the opening (2), a first wire (4) spanning the opening (2) and being connected to the first contact elements (3), and a second (10) wire spanning the opening (2) and being connected to the second contact elements.

2. The sensor according to claim 1, wherein at least one of the first wire (4) and the second wire (10) have a diameter of approximately 5–25 μm, preferably of 12.5 μm.

3. The sensor according to claim 1, wherein the contact elements (3) have ring segments (5) segmentally surrounding the opening (2).

4. The sensor according to claim 1, wherein the contact elements (3) have two first grooves (6) oriented parallel to each other.

5. The sensor according to claim 4, wherein the contact elements (3) have two second grooves (7), which form an angle of 25 to 45°, preferably of 35°, with the first grooves (6).

6. The sensor according to claim 5, wherein the contact surfaces (K) bounding the second grooves (7) are connected in each case to one of the ring segments (5) via a first conductor track (L1).

7. The sensor according to claim 6, wherein each of the contact elements (3) is connected to a contact pad (8, 9) via a second conductor track (L2).

8. The sensor according to claim 1, wherein the printed-circuit board (1) has a length of 17–23 mm, preferably of 20 mm, a width of 5–10 mm, preferably of 7 mm, and a thickness of 1–3 mm, preferably of 1.5 mm.

9. The sensor according to claim 1, wherein the opening (2) has a diameter of 2–5 mm, preferably of 3 mm.

10. The sensor according to claim 1, wherein the distance between the first wire (4) and the second wire (10) is less than 3 mm, preferably approximately 1.5 mm.

11. The sensor according to claim 1, wherein the second contact elements are formed mirror-invertedly in relation to the first contact elements (3).

12. The sensor according to claim 1, wherein a conically widening tube portion (11) is provided upstream and/or downstream of the first wire (4).

13. A method for producing a sensor according to claim 1, wherein the first contact elements (3) have first and second grooves (6, 7) formed therein and the second contact elements have first and second grooves formed therein, said method comprising the steps of placing the first wire (4) into the first (6) and second grooves (7) of the first contact element (3), subjecting the first wire to a predetermined tensile stress and subsequent electrical bonding, and placing the second wire into the first and second grooves of the second contact element, and subjecting the second wire to the predetermined tensile stress and subsequent electrical bonding.

14. The method according to claim 13, wherein the first wire (4) and the second wire (10) are soldered to the first (3) and second contact elements, respectively.

15. The method according to claim 13, wherein the printed-circuit board (1) is turned through 180° after the electrical bonding of the first wire (4) and then the second wire (10) is brought into contact with the second contact elements.

16. A method for producing a sensor according to claim 1, comprising the steps of:
   a) producing a multiplicity of first contact elements (3) next to one another on an upper side and a multiplicity of second contact elements on an underside of a printed-circuit board,
   b) placing a first wire (4) over the multiplicity of first contact elements (3) under the effect of a predetermined tensile stress,
   c) subsequently electrically bonding said first wire to said first contact elements,
   d) placing a second wire (10) over the multiplicity of second contact elements under the effect of a predetermined tensile stress, and
   e) subsequently electrically bonding said second wire to said second contact elements.

17. The method according to claim 16, wherein the first wire (4) and/or second wire (10) is placed into first (6) and possibly second grooves (7) formed in the first (3) and/or second contact element.

18. The method according to claims 16, wherein the printed-circuit board is divided into individual boards (1) after the electrical bonding of the first (4) and second wires (10).

* * * * *